(12) United States Patent
Okude et al.

(10) Patent No.: US 7,590,486 B2
(45) Date of Patent: Sep. 15, 2009

(54) AUTOMOBILE NAVIGATION APPARATUS

(75) Inventors: Mariko Okude, Tokyo (JP); Shigeru Matsuo, Tokyo (JP); Kimiyoshi Machii, Tokyo (JP); Yoshitaka Atarashi, Tokyo (JP)

(73) Assignee: Xanavi Informatics Corporation, Zama-shi (JP)

( * ) Notice: Subject to any disclaimer, the term of this patent is extended or adjusted under 35 U.S.C. 154(b) by 739 days.

(21) Appl. No.: 11/045,067

(22) Filed: Jan. 31, 2005

(65) Prior Publication Data

US 2006/0080030 A1    Apr. 13, 2006

(30) Foreign Application Priority Data

Jan. 29, 2004   (JP)   .............. 2004-021408

(51) Int. Cl.
*G08G 1/123*   (2006.01)
*G08B 1/00*   (2006.01)
(52) U.S. Cl. ............... 701/208; 340/995.1; 340/995.12; 340/995.14; 340/995.18; 340/539.2; 701/200
(58) Field of Classification Search ............. 340/995.12
See application file for complete search history.

(56) References Cited

U.S. PATENT DOCUMENTS 6,980,907 B2 * 12/2005 Umezu et al. ............... 701/210

2003/0036848 A1 * 2/2003 Sheha et al. ................ 701/209
2003/0182056 A1 * 9/2003 Nozaki et al. ............... 701/209
2004/0172189 A1 * 9/2004 Maeda ........................ 701/200
2004/0203909 A1 * 10/2004 Koster ....................... 455/456.1

FOREIGN PATENT DOCUMENTS

JP    09/145383    6/1997
JP    2003-042771   2/2003

* cited by examiner

*Primary Examiner*—Thomas G Black
*Assistant Examiner*—Sze-Hon Kong
(74) *Attorney, Agent, or Firm*—Crowell & Moring LLP (57) ABSTRACT

An automobile navigation apparatus, that has a rewritable recording medium and capability to updates the map data base by obtaining latest map data, records the map data in the recording means and comprises updating data acquisition means that acquires updated data of a map to which updating procedure is added, an information interpreting means that interprets the updating procedure information, and a map data updating means that searches over said map data base and updates said map data base on the basis of the results of such interpretation and manages the map data by using attributions that indicates additional information of the map elements which are composed into a table as the records thereof so that the row record of the table is classified by the attribution which indicates the additional information of the map element.

6 Claims, 10 Drawing Sheets

```
; Changing the contents of the facility (poi) data and updating the evaluation data ;
<poi>
<command1>update       ; Instructing to change the contents of the facility data
<command2>
<proc>calculate</proc> ; Computing the predetermined attribution of the facility data
<element>eval</element> ; Predetermined Attribution = Evaluation Value
</command2>
</command1>
<id> ... </id>
<name>
  ...
</poi>
```

AUTOMOBILE NAVIGATION APPARATUS

FIELD OF THE INVENTION

The present invention relates to an automobile navigation system, especially an automobile navigation apparatus for which a method to partially update the necessary part of the recorded map data by recording the map data in a rewritable recording means.

Automobile navigation systems that use rewritable media such as hard disks and removable memories for recording map data that are necessary for the map presentation and the destination retrieval have already been commercial products.

The map data served for the navigation system is being obsolete in time past due to a newly updated information such as facility constructions and openings and closings of roads and highways. For such updating of the information, a service practice that the hard disks that are installed in the automobile navigation systems are sent back to the automobile dealers or manufacturers and then all of the map data are rewritten to store new map data has been maintained. There is such a problem for this service that the automobile navigation systems are not available until the disks have been returned to the users.

On the other hands, a new communicative automobile navigation system where useful information including map data is sent through portable phone data communication service between the file server of the information source and the automobile navigation system installed in the automobile has been available. A method of updating the map data by receiving the latest map data from the file server in the communication has been disclosed in the reference 1 and a navigation system that fetches the map data by downloading the map data from the file server is known by the reference 2. Since the users obtain the latest map data stored in the file server by downloading, the method features to provide the newest map data available to the user.

Reference 1:

Japanese Laid-Open Application, H9-145383, A (1997)

Reference 2:

Japanese Published Patent, 2003-42771, A (2003)

For the conventional automobile navigation system, however, the manufacturers manage the map data by using the specific data format so that map data is accessed by computing the addresses assigned from the head of the data file. In this automobile navigation system, there is a problem that the latest map data are not usable by using a system which adopts the different format or after the data format of the latest map data has been changed, modified or upwardly expanded since the updated map data has to be generated depending on the arrangement of the data of the file even when a part of the map data is updated. The customers and the third persons cannot flexibly customize the data structure.

In the automobile navigation system, the file which is under updating cannot be accessed by other applications. Therefore the functions of the map presentation and the route search cannot be carried out or the response for such functions becomes insufficient. For example, the user has lost the inherent utility of the automobile navigation such that the automobile navigation guides the user through pre-determined routes.

The objective of the present invention is to provide an advanced navigation system that functions to set the destination by obtaining the latest map data, serves for the navigation such as the route search and guidance, customizes the constructed data and uses for the map presentation and the route search while the data is being updated.

DETAILED DESCRIPTION OF THE INVENTION

In order to solve the problem described above, the present invention features the automobile navigation apparatus is constructed to have a data base which stores map data stored in the rewritable recording means, the map data are composed of the tables on which map elements are the records, the rows (records) of the table are classified by the attribution that presents attribution (or a qualifier called for the implementation in the format) of the map elements, the map data management means that enables to access the map data in a unit of the record, the updating data acquisition means that acquires the updated data of the map to which updating procedure is added, an information interpreting means that interprets the updating procedure information and a map data updating means that searches over the map data base and updates the map data base.

According to such automobile navigation system, it is possible that the map data base is updated, even though the format of the map data is extended, by embedding the procedure information in the map updating data and adding map data updating process means that interprets the procedure information and updates the map data base. Since the map data can be exclusively controlled in a unit of the table or the record after the map data are composed of the tables, the functions of facility information retrieval or route search are available while the map is being updated.

The present invention is explained in details with embodiments as follows.

First Embodiment

Figure 1:
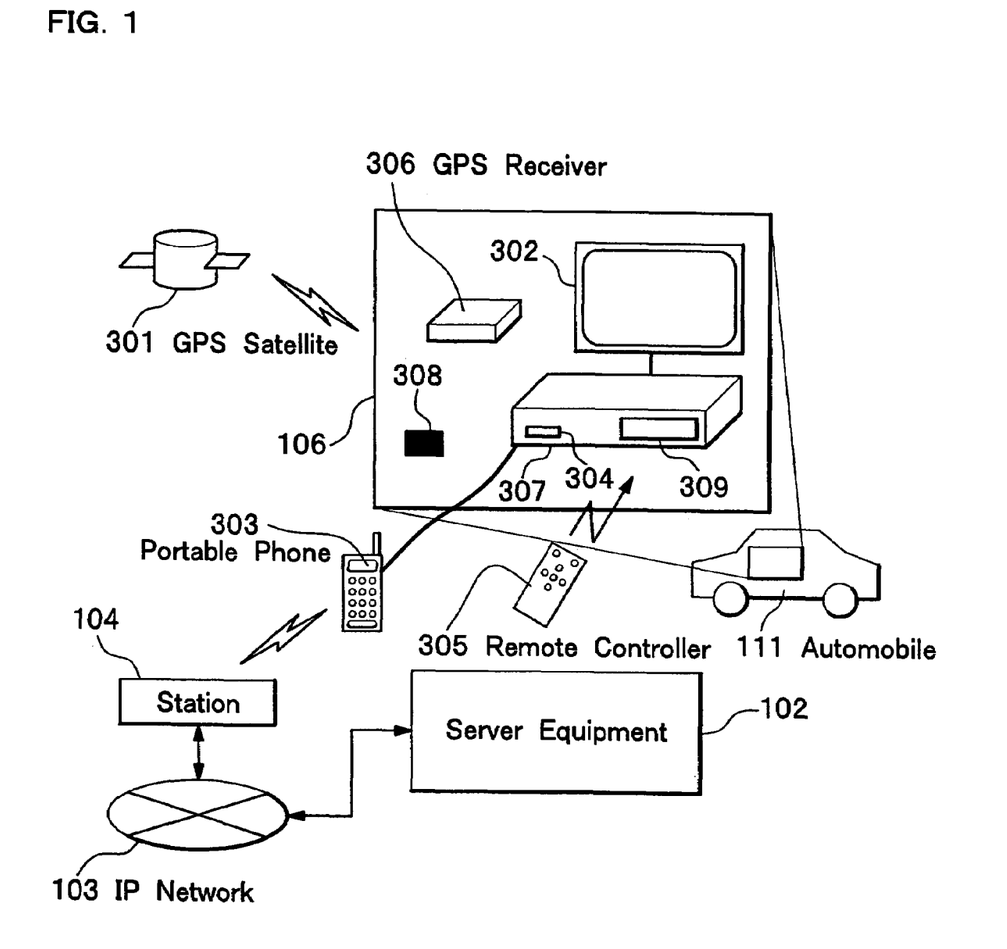
FIG. 1 is a schematic that shows the total system of the present invention.

FIG. 1 shows the total system of the present invention. The system is substantially composed of an automobile navigation terminal device 106, a station 104, server equipment 102 that supports data handing with the automobile navigation terminal device 106.

The server equipment 102 keeps the map data, the location information data such as restaurants and convenience stores etc. and the traffic information data as well. The automobile navigation terminal device 106 obtains the map information such as the latest facility information and road information etc., determines the route to the destination and has a function to guide the driver to the destination. The server equipment 102 may have a route search engine. For such case, the server equipment 102 executes the route search, sends back the result of the route search and stores the result in the server equipment 102 when the automobile navigation automobile navigation terminal device 106 requests the route search. In response to the requests by the automobile navigation terminal devices 106, the server equipment 102 retrieves the location information data, traffic information data etc.

The automobile navigation terminal device 106 regarding the present embodiment is explained in the followings. The automobile navigation terminal device 106 has a display device 302, GPS (Global Positioning System) receiver 306, a main body 307, a hard disk device 309, a memory card slot 304, a portable phone 303, a remote controller 305 and a microphone 308. The main body 307 has a CPU (Central Processor Unit), memories, a power supply, a graphic display device installed therein. It is possible to carry out the data transmission and the data receipt with the server equipment 102. The hard disk device 309 stores the map data the received data which have been transmitted from the sever equipment 102 and uploads the down loaded past information to the automobile navigation terminal device 106. It may be possible to store the received data which have been transmitted from the server equipment 102 in a removable memory device such as a memory card which is to be attached to the slot 304 just like as to store in the hard disk device 309. If the user allocates the map data to be stored in the hard disk device 309 and the contents data such as music and images to be stored in the removable memory like as a memory card. Then the user can co-use the memory card for other devices to play back the music and the images.

In the system configuration as described above, a portable phone 303 is used as a communication device to communicate with the server equipment 102. Other communication devices such as a PDA (Personal Digital Assistance) and a modem connected to a transceiver built-in the main body 307. By using satellite broadcast, wireless LAN equipped with hot spots, the vehicle narrow band communication DSRC (Dedicated Short Range Communication), the facility information, map and area information, entertainment information etc. may be received. In stead of the portable phone 303, it is possible to connect to the vehicle LAN (Local Area Network). In stead of GPS receivers 306, a location identification service using PHS (Persona Handy phone System) is exploited.

Figure 2:
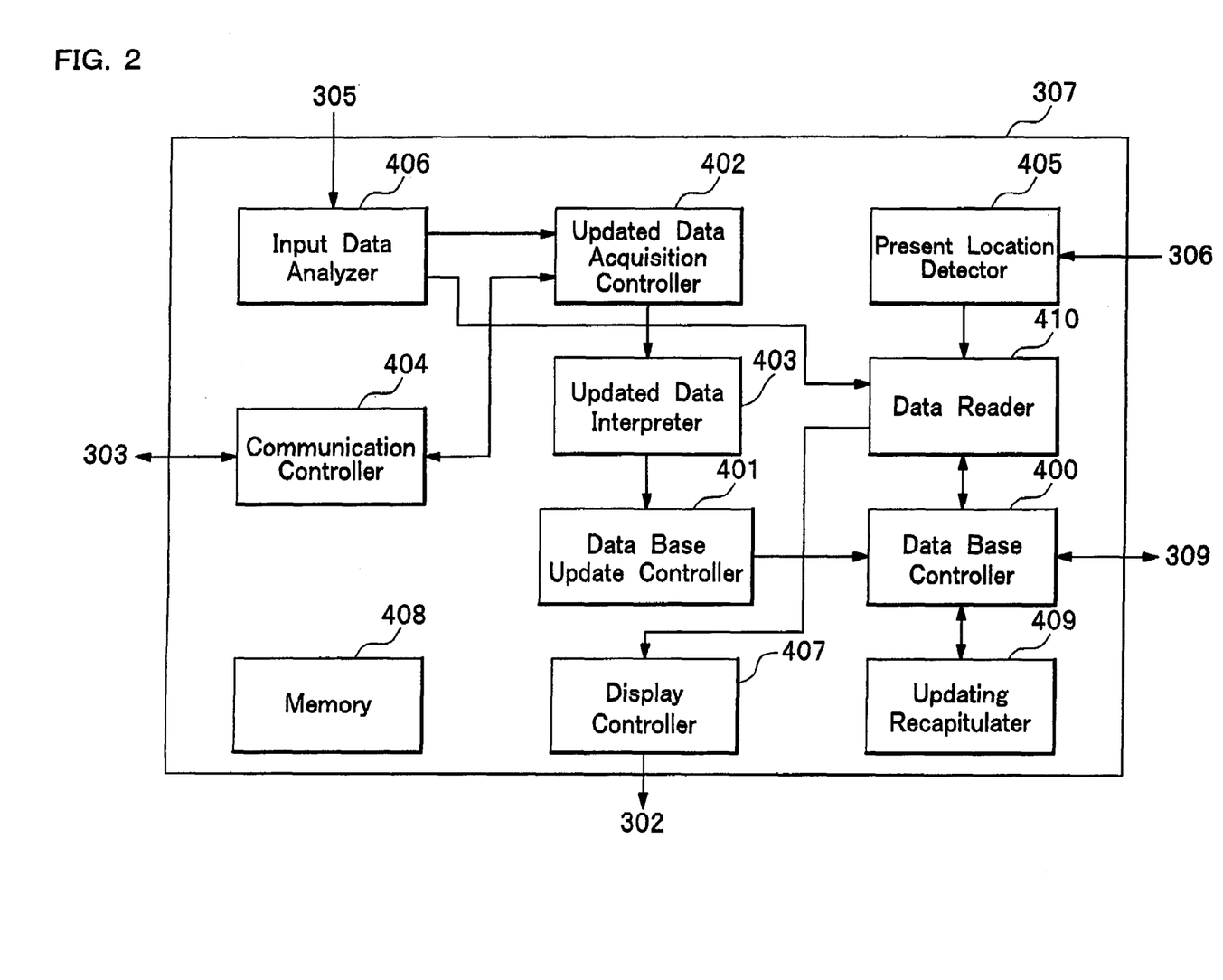
FIG. 2 is a block diagram that shows the implementation of the functions relating to the data updating.

FIG. 2 shows the functional blocks of the functions implemented in the CPU which is installed in the main body 307 shown in FIG. 1.

The present location detector 405 sets the present location of the automobile by using the location data obtained through the GPS receiver 306. By acquiring the output data from a gyro and a directional sensor and further velocity sensor to detect the speed of the automobile and sensors to detect the direction of automobile driving and the travel distance, the present location detector 405 may compute the moving distance and the driving direction and then estimate the current position of the automobile before the next updated DPS data is received. An input data analyzer 406 receives the user requests through the input devices such as the remote controller 305 and the microphone 308 and controls the functional units as shown by the functional blocks to operate the process to meet the requirements after analyzing the user requests. The communication controller 404, being connected with the portable phone 404, is to control the transmission and receipt of the data with the server equipment 102. The connection with the portable phone may be done by infra red optical communication or the wireless communication other than the wires.

A data base controller 400 is a part of the fundamental function of the data base system where the data once retrieved from the data base is stored in a cache memory for quick access afterwards, a transaction operation to monitor the data updating until the procedure is normally ended, an exclusive control to block the map data and the map record which are under updating, a recovery routine to the data missing by using past logs and backup data, management of the index records which are used for the map data, the map data retrieval and else. When the position that the present location detector 405 detects and when the display area of the map is changed (as in the scroll and in the scale change) through the input data analyzer 406, the data reader 410 sets the display area necessary for display, sends a retrieval command of the display map data to the data base controller 400 and sends the display controller 407 the resulting map data obtained by the data base controller 400. The display controller 407 once expands the map image in the memory 408 and the image is showed on the display device 302. The updated data acquisition controller 402 requests the updated map data to the server equipment 102 through the communication controller 404 and acquires them. The updated data acquisition controller 402 may obtain the facility information etc. which the user has input as added or partly deleted through the input data analyzer 406. The updated data interpreter 403 interprets the updating methods and the updating procedures such as to specify the parts which need the updating in the map data base and the new data to replace for the updating. The data base update controller 401 generates a command to access (retrieve, insert, delete and modify) the map data base and sends the command to the data base controller 400. The updating recapitulater 409 records and retrieves the updating recapitulation.

Figure 3A:
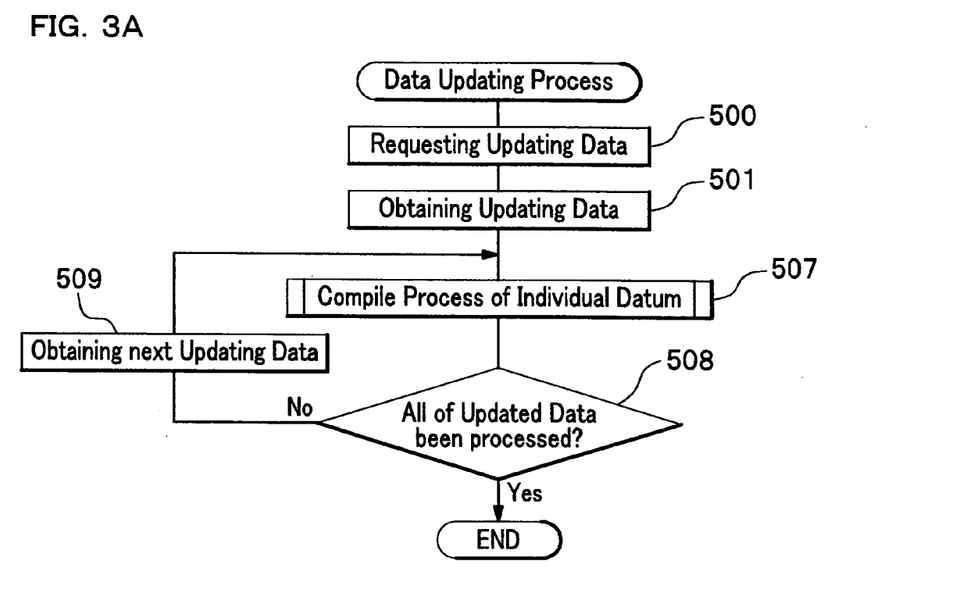
FIG. 3A is a flow chart that shows the steps for updating the map data.
Figure 3B:
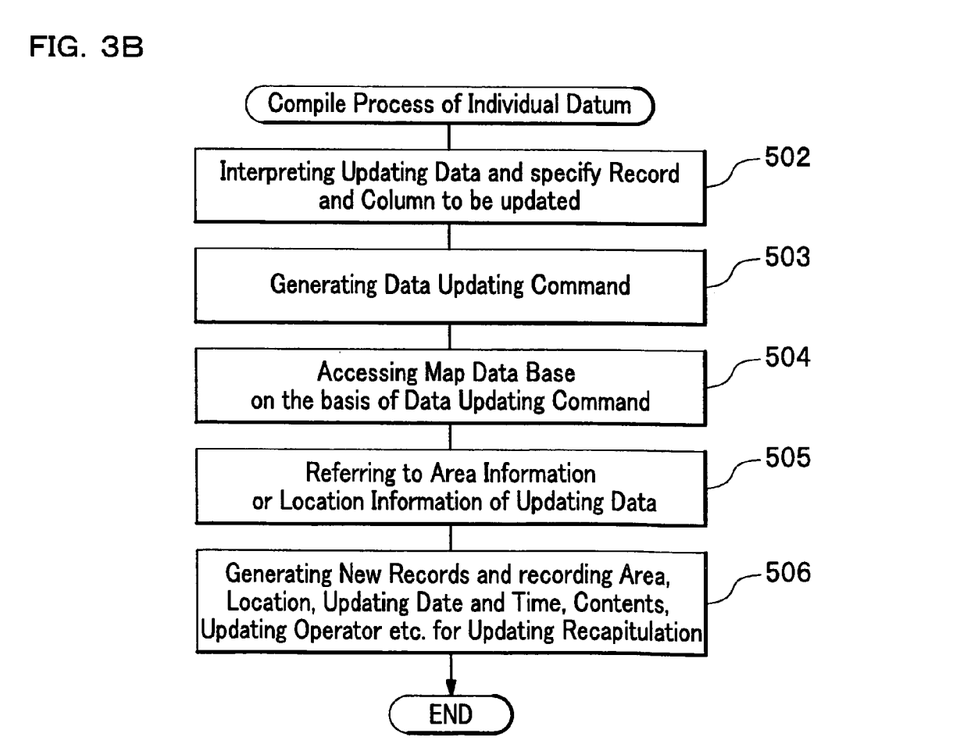
FIG. 3B is a flow chart that shows the steps for updating the map data.

FIG. 3A is the flow chart that shows the steps for updating the map data and FIG. 3B is the flow chart that shows a compile process of individual datum.

In order to update the map data, a map data request command that includes items to be updated such as the specific place specified by the area information, for instance, district names, along-road information, the present locations near-by, or the destinations near-by and location information, the present location, stopping over, destination and specified by the data kind information, facility data and road data etc. both in the updated data acquisition controller 402 is sent to the server equipment 102 (Step 500). Then, the updated data acquisition controller 402 receives the updated map data from the server equipment 102 in response to the map data request command (Step 501). Based on the updated map data acquired from the server equipment 102, a compile process of individual datum is carried out each by each in the updated data interpreter 403 (Step 507). A judgment whether all of the updated data has been processed (508) and the process that is to compile the individual datum (Step 507) is carried out until all of the map elements included in the updated data are completely updated.

As shown in FIG. 3B, the compile process of individual datum first interprets the updating procedures included in the updated map data acquired by the updated data acquisition controller 402 such as to specify updating methods and procedures and to specify the table, the record and the column (which implies the attribution of the data) (Step 502). The data base update controller 401 sets the table, record or the column as a retrieving item, generates a data updating command that updates the map data base based on the updating method included in the updated map data and sends the data updating command to the data base controller 400 (Step 503). The data base controller 400 accesses the map data base in accordance with the data updating command and carries out to rewrite the data of the record to be updated after retrieving (504).

Referring to the area information (areas such as ward, village, county and city) or the location information, new records are added to the updating recapitulation data table, the resultant area information and location information after referring are memorized into the additional records corresponding to the updated information such as the updated date and contents (506). When the map data base is normally completed, the update recapitulation data including the detail information such as the updated date, the data version, the updating operator is recorded in the updating recapitulation (Step 506). The data updating command that the data base update controller 401 generates a command to control the table management that generates a new table as well as rewriting the record data.

As have been explaining, the user can use the latest map data for the navigation services in such a way that retrieving the information of the map data, presenting the map, retrieving the destination, searching the route and obtaining the guidance are performed.

Figure 4:
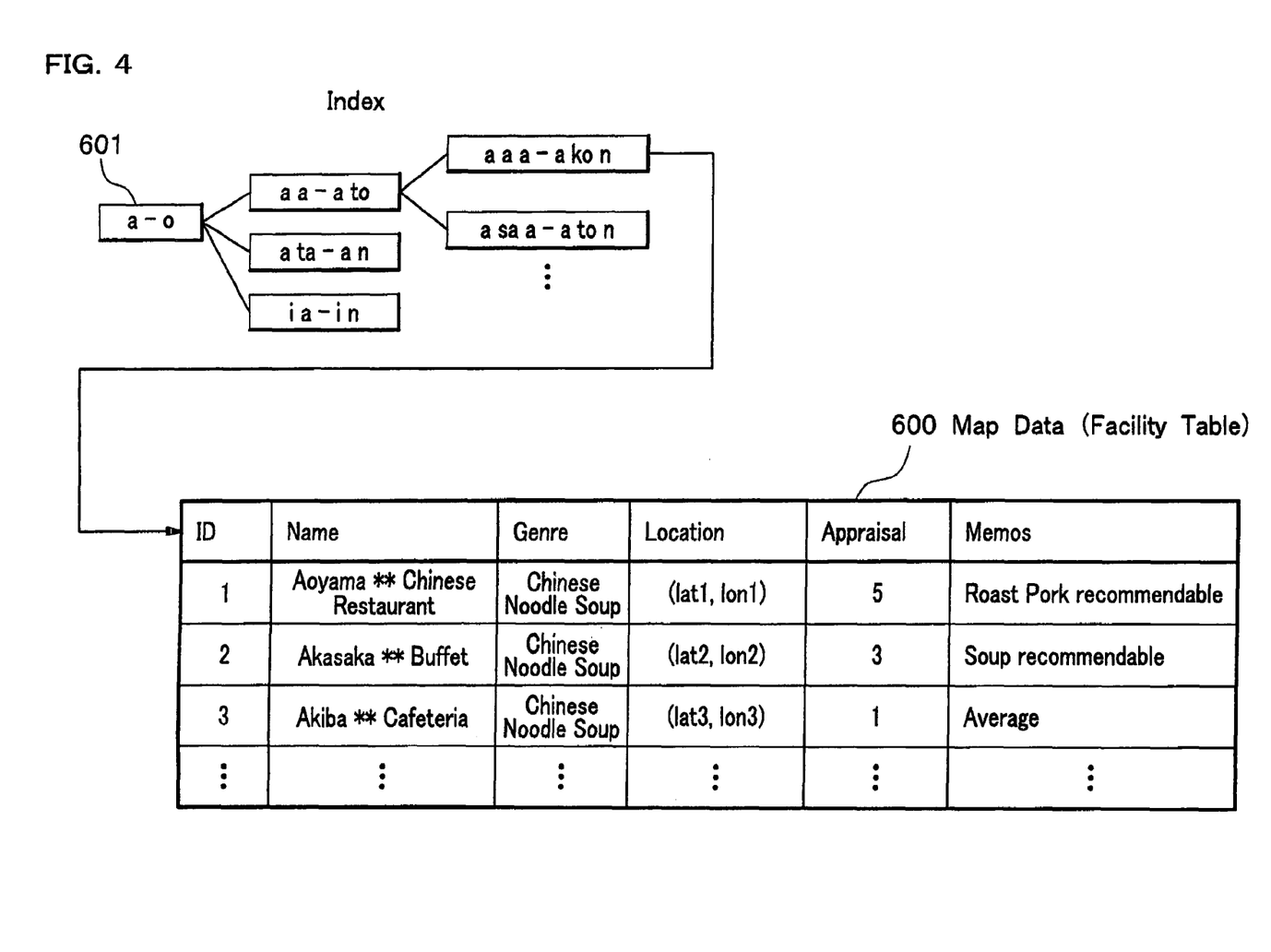
FIG. 4 is an example of the presentation of the map data base.

FIG. 4 shows the example of composition of the map data base used in the present automobile navigation apparatus. The composition of the map data is explained by using an example of the facility data. Other than the facility data, the kinds of the map data are classified for the kinds themselves and purposes for use such as the road data, the road search data and VICS (Vehicle Information and System) compliant to data and are controlled as a different table. In addition, the common name of the districts, self-governing bodies, administrative location are controlled in an independent table.

One example of the facility data table (600) is shown in FIG. 4. The facility data table includes an ID number assigned to each individual facility, facility names, genre of facilities, location (in longitude and latitude), appraisal (or evaluation) and memorandum placed in the column (which shows the attribution of the facility data). Other than this column, the attribution can be extended to include the phone numbers, addresses, area names, closing days, open time, pronunciations of the names and the areas on necessity. The records that compose the table correspond to the map elements and the attribution of the records corresponds to the appended information belonging to the map elements. In case that the table is the road data table, the attribution includes the kind of roads as the public roads, national roads, names of the roads (interstate 6, etc.), lane width, the coordinates of the road. In this table configuration, the updating is carried out when the updating items (the map element as new facilities and available roads) are not found in the previous map data by comparing the updating map data with the previous map data like as the conventional updating method. In the updating of the present invention the updating items which are not found in the previous map data partially alter the previous map. Therefore the updating process is for the updating items is not necessary for the whole map data, that results in suppressing the process time necessary for the updating. The determination of the updating method is done by the comparison of the table with the previous map data and therefore the updating time can be shortened.

An index (601) is exploited. The index (601) is information to retrieve the specific data in the facility table (600) in high-speed. For example, the retrieval using the facility names for the key index shows the alphabetical name of the actual pronunciation of the facility name. The index is made in advance and is recorded in the hard disk device 309 with the map data. When the facility table is updated, the index needs to be reconfigured. Therefore, it can be expected that the user has to wait for conducting to retrieve the facility data until the completion of the updating of the index against such a requirement of the user that we would use to retrieve the destination as soon as the map data is updated. Therefore, an improved method can be adopted such that a new different table is made for the facility data which are frequently updated (such as those of convenience stores and restaurants) and the timing of updating of the index is changed by setting availability or non-availability of the index. It is possible to avoid the long waiting time before retrieving the facility data by adjusting the timing of the updating of the index in response to the kinds of the map data.

For example, when "Aoyama  Chinese Restaurant" is retrieved by using the present table configuration, the retrieval is carried out by tracing the index (601) that are given by the alphabetical pronunciation and finding the record of the data area of which head index is same as "Aoyama  Chinese Restaurant".

The appraisal (or evaluation) included in the table indicates a user subjective appreciation of the facility. The appraisal is presented by a total appraisal or may be classified in plural appreciation items such as "taste", "mood" and "price". The rating of the appreciation can be quantitatively done by numbers or qualitatively done by typical words as "good", "normal" and "bad". By including such user subjective information in the data base, the user can retrieve the desirable facility by such personal preference. If the result of the retrieval is set to the destination, it is possible to guide the user to the "good restaurant".

When an attribution that indicates the user subjective appraisal is appended to the road data table, the record of the road data table is configured by the road linkage and the attribution is set with the information of the sight view as "open" and "good scenery". Then, it is possible to search the routes to the destination on which "open" sight and "good scenery" in the view are obtained.

Figure 5:
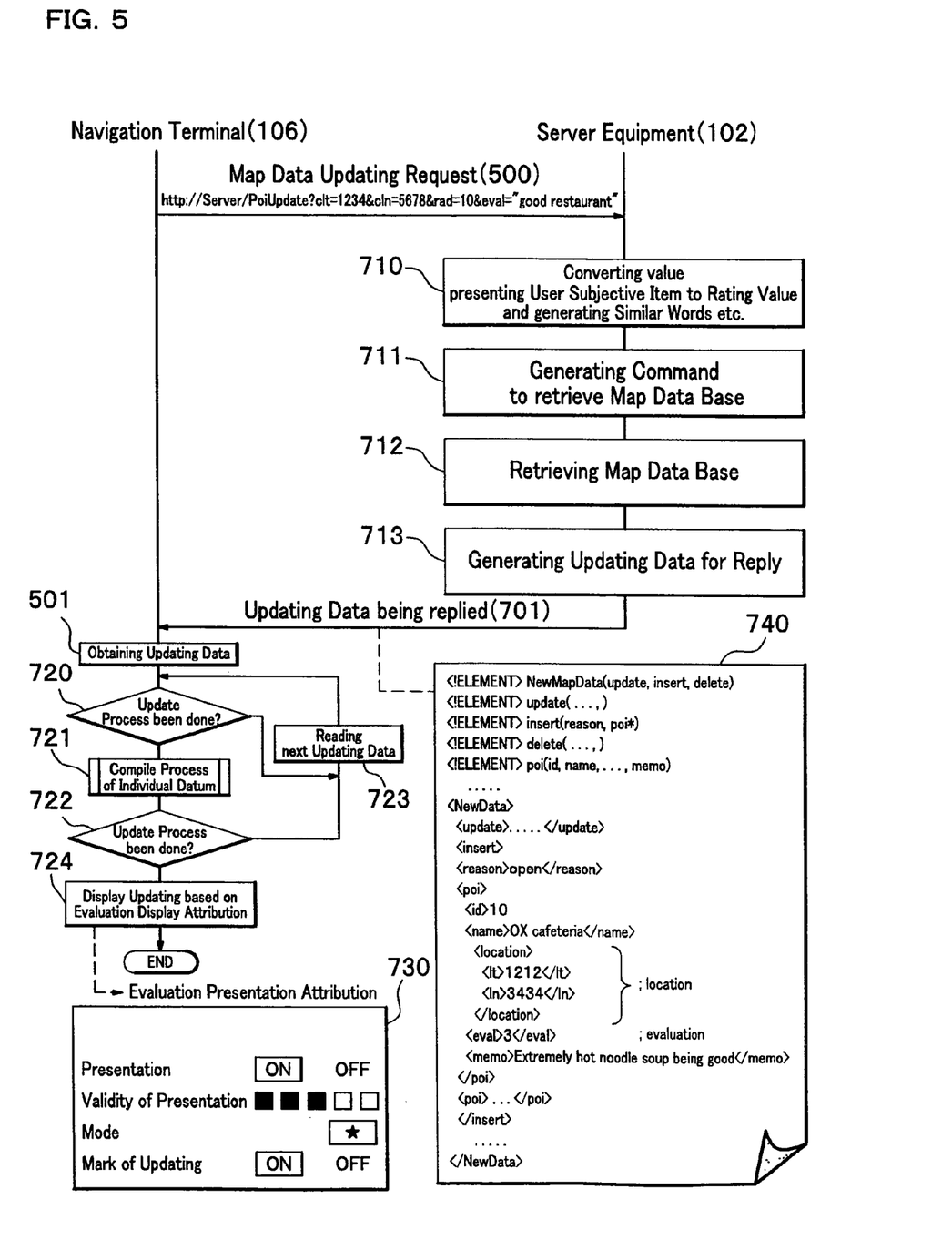
FIG. 5 is a flow chart that shows the steps for updating the map data by using user subjective information.

FIG. 5 is a flow chart that shows the procedure to acquire the data from the server equipment 102. The data is based on the user subjective information and used for updating the map data.

An example of the updating is explained in the following. The automobile navigation terminal 106 sends a map data updating request (500) to the server equipment 102 under the joint condition of near-by the present location and "good restaurant". "PoiUpdate" in the map data, updating request (500) is the command to request "map data updating", "clt" and "cln" are the longitude and the latitude of the present location of the vehicle, "rad" (radius in kilo meters) the range of retrieval at the present location which is the center of the range and "eval" the subjective items. The example shown in FIG. 5 implies that an updating data including a "good restaurant" subjectively defined by the user and located in the range of 10 Km at the center which is 1234 in longitude and 5678 in latitude.

When the server equipment 102 receives the map data updating request (500), the server equipment 102 carries out the process to convert the value set for "eval" to a predetermined value (710). In this example, the subjective word "good" is cut out from the data as "good restaurant" and converted into a predetermined rating value. The plural synonyms to "good" (such as "good taste", "recommendable" etc.) are composed. In the next step, a command to retrieve the map data base using the converted rating value or the plural synonyms as a retrieval key is generated (711). As the command to retrieve the data base, SQL (Structured Query Language) is generally used however the other commands in the different query system can be adopted as far as the commands have capabilities to retrieve the data base by using the predetermined keys. In the present embodiment, the server equipment 102 has a predetermined rule to set the rating values larger than 3 for "good restaurants". Therefore the retrieval condition is set as the rating value being more than 3, the center coordinates (clt, cln) and 10 Km radius and the data base retrieval is carried out with this condition. The server equipment 102 generates an updated data for a reply on the basis of the result obtained by retrieving the data base.

As for the reply data, for example, XML (extensible Markup Language) as shown in the updating data 740 is used. "NewMapData" is the data structure of the facility data in the reply. The updating procedure information is defined by the data structure. For example, the data structure of NewMapData is defined as "update, delete, insert". This implies that the updating data of the map are composed of "content updating data, delete data, new inserting data". Since the updating data of the map is placed in the order of the "update, delete, insert", the automobile navigation terminal device 106 updates the data in the order of "update, delete, insert". As for the command to set the order of updating data, it is also possible to directly instruct the updating order of the facility data by adding a tag which indicates the order (for example, <order>, updating order </order>) to facility data structure poi. By instructing the order of updating data, the popular facilities and those having high utility values (such as well equipped for children and handicap peoples) can be added to the facility data in high priority. By sorting the facility data in the order of high priority in the server equipment 102 which generates the updating data for reply, the similar effects are obtained.

Figure 11:
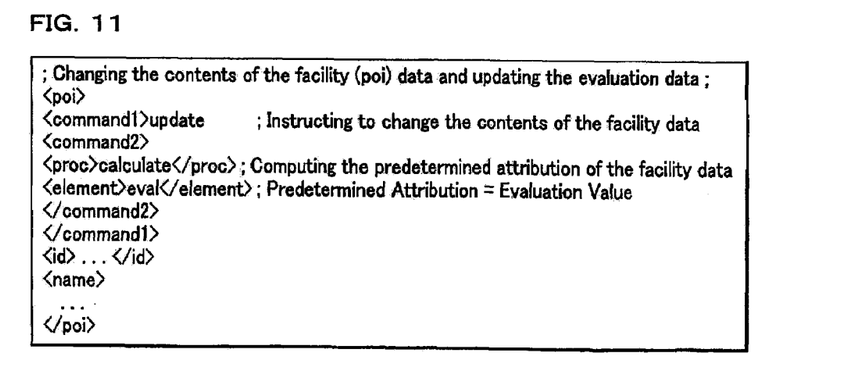
FIG. 11 is a chart that shows definitions of updating procedures.

For the present example, by implementing the procedures (inserting, deleting, etc.) defined in the data structure regarding the updating data NewMapData, the method and process to set the order of deleting and/or inserting have been explained above. In addition, it may be allowed that the updating procedure information is defined in the data structure of the facility data poi. For this case, the updating procedure information enables to instruct a procedure by which a series of processes are linked in continuation such as the computation of the value of attribution "rating value" of the corresponding record when the facility information is updated thereto. FIG. 11 shows the example of such updating. For the data structure regarding this defining, it is possible to instruct the updating procedure in each facility data (facility elements), it becomes possible to direct a detail updating to the facility elements such as to execute a predetermined operation in accompany with the updating predetermined attribution of the facility data.

For the example shown in FIG. 11, the updating data is judged as an updating of the facility data from the tag "<command1>" of updating procedure information and the data in the existing map data base are replaced by the data of the facility code (id) and the facility name (name). According to the instructing to compute the evaluation values of the facility data by the updating information command 2 as defined between "<command 2>" to "</command2>", the evaluation value is computed. As for the computation of the evaluation value, for example, there is another method to obtain the evaluation value by converting word trains to the evaluation value in accordance with the evaluation attribution instructed in evaluation presentation attribution 730 after extracting the convertible word trains such as "delicious", "good taste" etc. to the evaluation value among the information written in, for example, the attribution "memos". For the case when there are plural evaluation value items as "taste" and "mood", a consolidated evaluation value may be obtained and used.

The navigation terminal 106 obtains the updating data (501) by receiving the updating data (740) and the updating data is judged (720) regarding whether it satisfies the updating condition which has already been set in the navigation terminal 106. Referring to the data which have been selected as the updating objects, the map data base is updated (720) in accordance with the compile process of individual datum. For example, "good restaurants" is obtained after retrieving with the condition as being more than 3 of the evaluation value (or appraisal value). If the user has set the updating condition such that the facility that has the data base which is rated as "5", the compile process of individual datum is carried out for the facility that is rated as "5" after selection. There is the case that the existing facility data in the map data base has been changed in the evaluation against that before the evaluation. Therefore, the facility data instructed in "update" may be the object of the updating method of the updating data 740. By using subjective input such as locating close to the present place (10 Km range) and "good restaurants", the user can obtain the latest map data and use the updated map data for the navigation process such as information retrieval, map presentation, destination search, route search and guidance.

It is judged whether all of the selected updating data have been processed for updating (722). If all of the updating process has been done, the updated map data is displayed (724) in the display device 302 in accordance with the distribution attribution set in the presentation attribution display (730). In case that the data updating condition has not been satisfied or the data updating process has not been completed, the next data is read on the basis of the acquired updating data (723). According to the example shown in FIG. 5, the facility presentation attribution (730) shows that the evaluation presentation is "ON", the facility to be displayed (or evaluation display) is "more than 3 in the evaluation presentation", display mark given by star marks, the icon display of the updated facility "ON". The display attribution such as display/non-display of the updating recapitulation, kinds of color/line/pattern/transparence mode, etc. is set on the display of the presentation attribution (730) of the presentation setting means. The information of the updating recapitulation is displayed in accordance with the display attribution set as above.

Figure 6:
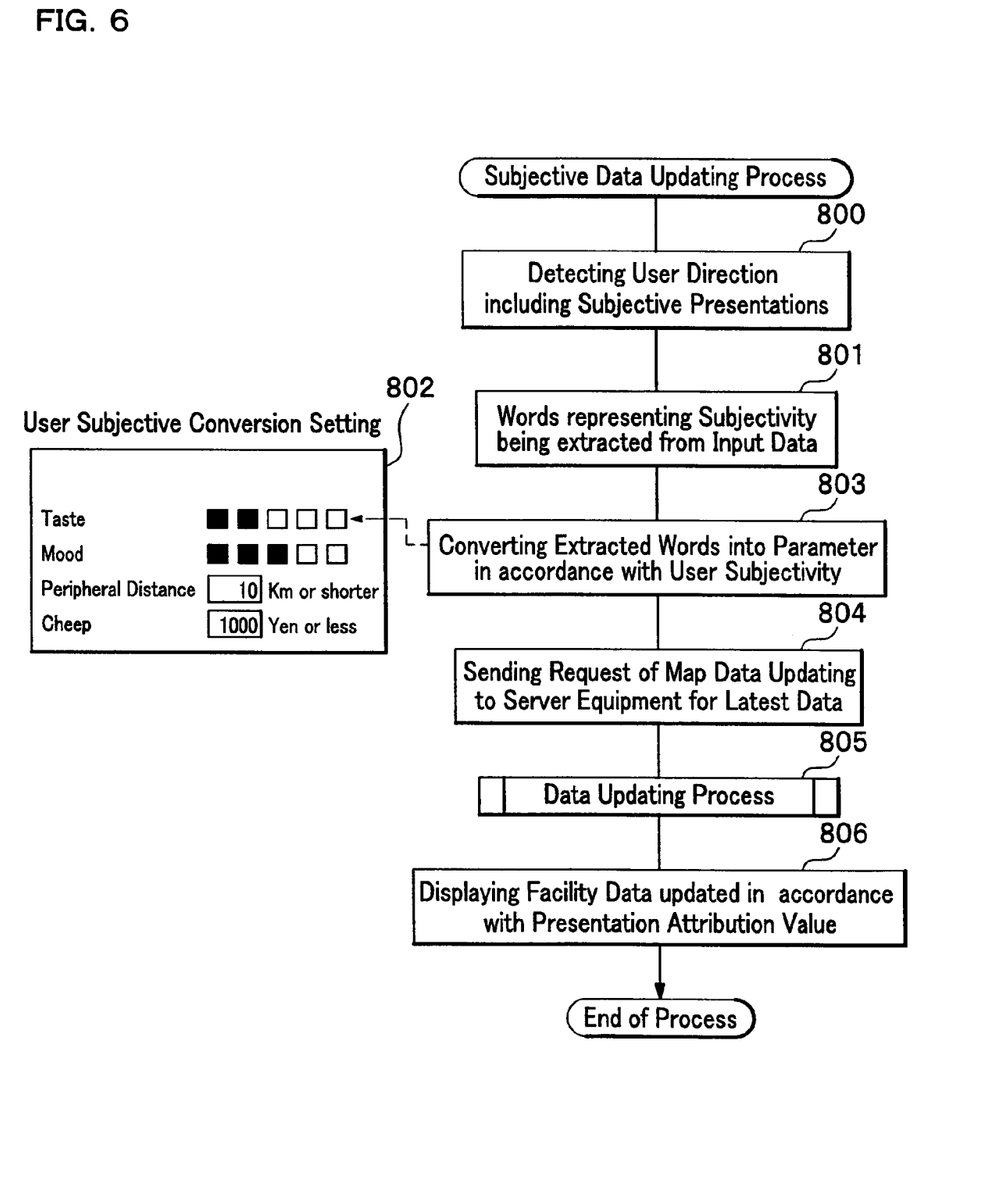
FIG. 6 is a flow chart that shows the steps for updating user subjective data.

FIG. 6 is a flow chart that shows the steps for the user subjective data updating process where the user subjective data of the user is interpreted and the data is updated.

Receiving the user instruction (800) including the subjective presentation such as "updating the good restaurant nearby" through the input device such as a remote controller 305, touch panel, or microphone 308, the word (or a series of words) representing is extracted (801). The words corresponding to the subjects (as the word typically represented by an adjective "large", "small", "far", "near", "delicious" and "nasty") are input in advance and the same words are extracted from the sentence that the user has input. The extracted words (or series of words) are converted into predetermined parameters (803) in accordance with the conversion values set in the user subjective conversion value (802). For example, "good" is an appraisal for the taste and "good" is set for the appraisal of which evaluation is more than 2 and "near" is an assessment for the peripheral distance. The locations of which distances are less than 10 Km in the peripheral distance are converted to "near". By using the user subjective presentation given in such the conversion as the updating condition, the map data updating request 500 is sent to the server equipment 102 (804). In accordance with the received updating data, the data updating process (805) is carried out and map data base is updated. After then, the facility data which has been updated is displayed in accordance with predetermined presentation attribution value (806).

Figure 7:
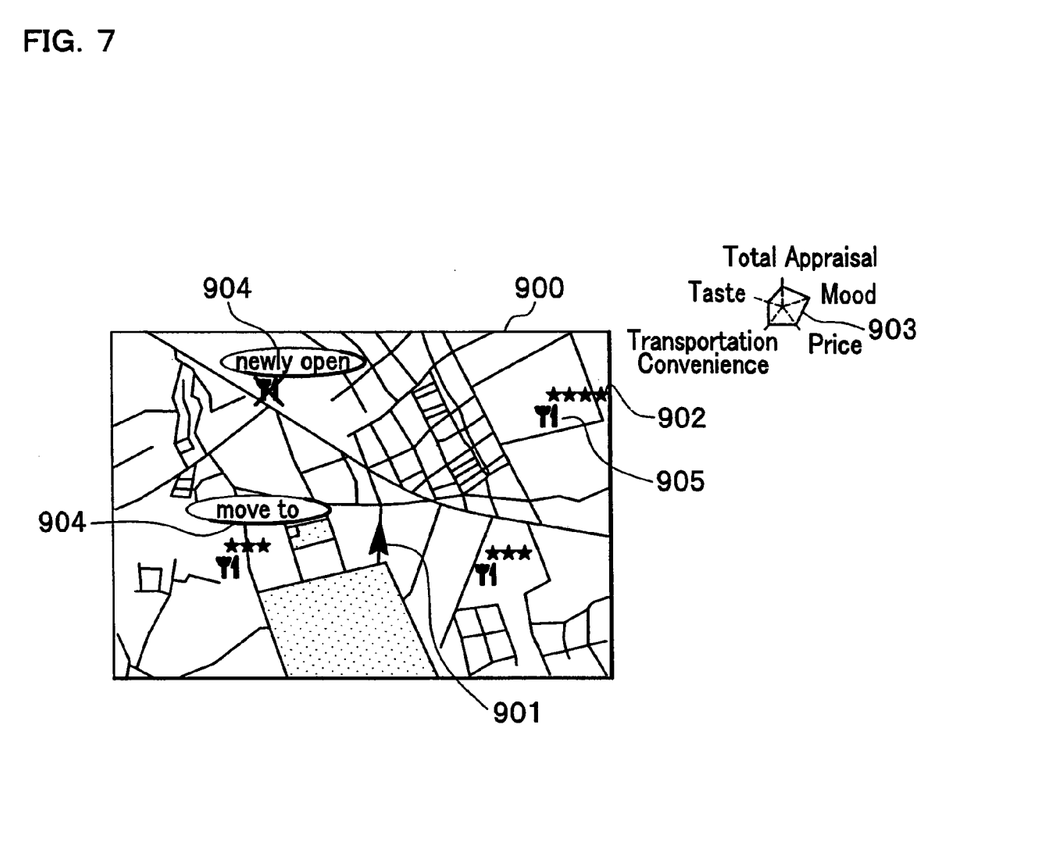
FIG. 7 is an example of the display presentation of updated facility data and the user subjective information.

FIG. 7 shows an example of the display of the facility information updated in the flow charts shown in FIG. 5 and FIG. 6. The display (900) of these examples shows the case when the display of the user subjective information is set to be valid. The number 901 shows a mark for the present location of the bicycle. The present attribution has been set such that "good restaurant" as the user subjective information is presented by star marks. Other than the word "good", "mood" and "price" are altered in the display by switching. Other display method as displaying the evaluation items are given in a chart 903.

In the present embodiment, it is possible to add the information such as "newly open", "shop closing", "move to" by adding the tag "<reason>" that indicates the reason for updating the facility data poi. For example, it is possible to append icons such as "newly open", "move to", etc. regarding the facility data added due to its new opening. The closed facility may be deleted from the data base in accordance with the update command "delete". By extending the attribution of facility table 600 of the map data base, it is possible to display the closing facilities by using the different display mode (color, transparent mode and appending cross sign) to distinguish from the other facilities. More concretely, the facility status is added as a new attribution to the facility data base 600 and an updating reason such as "newly open", "closing" and "move to" is recorded. When the facility information is displayed, the facility in the display mode such as "newly open", "closing", etc. is presented in reference to the updating reasons. The closed shops may be deleted from the map data base after passing a certain time from the time when the map data is updated.

As has been explaining, it is possible to obtain the latest facility data by instructing the conditions such as "shop in the peripheral distance" and "good taste". By defining new information which is not given in the existing maps as an attribution of the corresponding map element and adding the information to an new item for the format of the updating data, it is possible and facilitate to add new shops and restaurants to the map data or to add the user specific information such as a short note or user subjective information because the updated information can be automatically compiled in the map data base in the automobile navigation apparatus as well as being updated.

Figure 8:
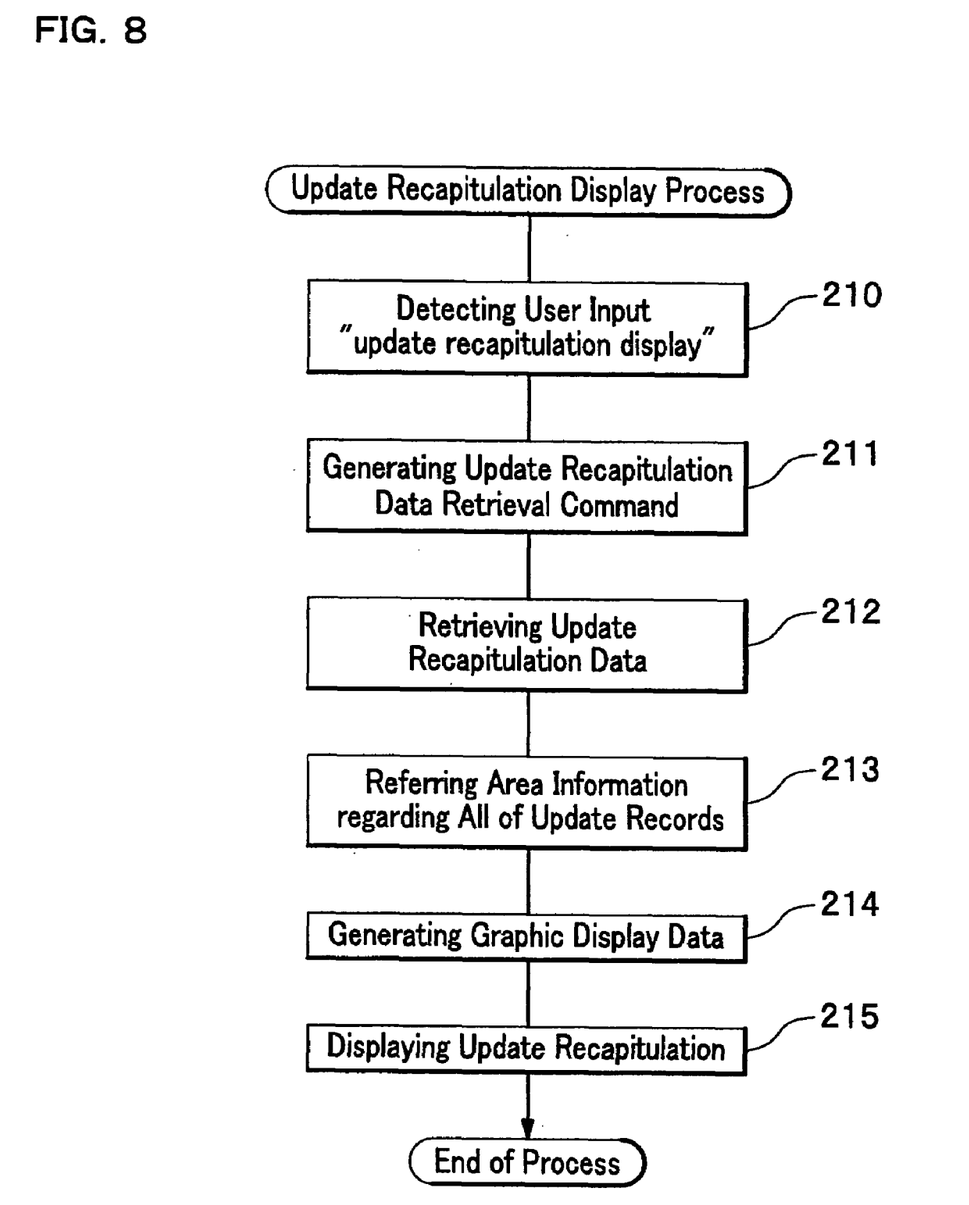
FIG. 8 is a flow chart that shows the steps for recording and presenting the updating recapitulation.

FIG. 8 shows a flow chart that is for the process to display the updating recapitulation with recording and referring to the updating recapitulation in the updating recapitulater 409.

For updating the map data base, the compile process of individual datum as shown in FIG. 3B is performed as follows. After referring to the area and the location (for example, "location" of the updating data 740) (505), the new record to the updating recapitulation data table stored in the hard disk device 309 is added and the command to memorize the areas (such as ward, village, county and city) and the location in the record in corresponding to the updating information such as updating date and time and the contents (506) is sent to the data base controller 400. By this process, the update recapitulation of the map data base is complied in the update recapitulation data table.

When the user inputs the "update recapitulation display" (210) after the updating of the map data base has been completed regarding all facility data in the updating data, an update recapitulation data retrieval command is sent to the data base controller 400 (211). On the basis of the update recapitulation data retrieval command, the area information in the update recapitulation data is retrieved (212), the area information (213) is referred regarding all of the update records updated in the compile process of individual datum, a graphic display data (214) regarding the area information subjective to the updating is generated, the update recapitulation is displayed on the display device 302 (215).

Figure 9A:
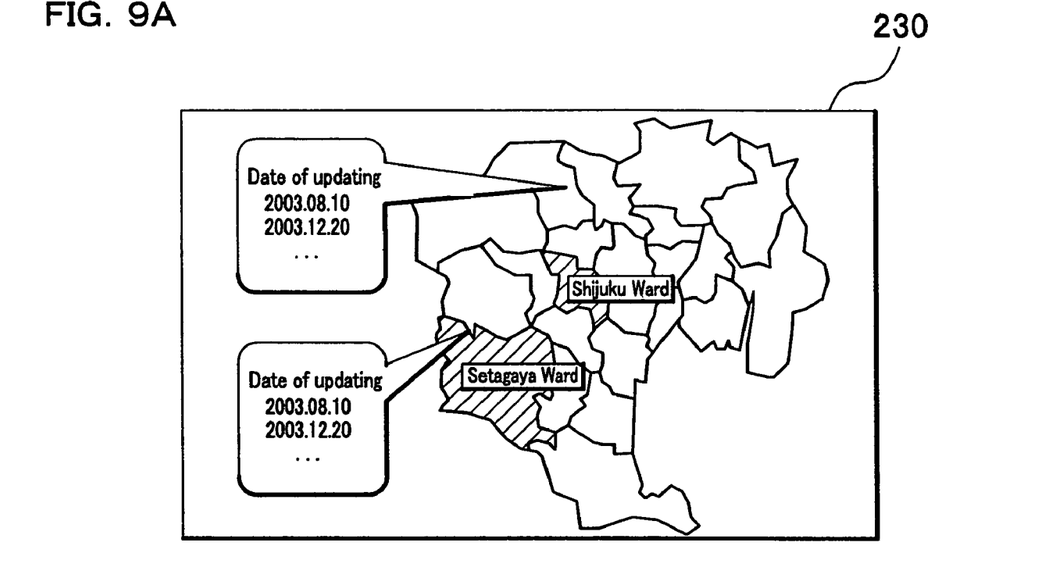
FIG. 9A is an example of the presentation of updating recapitulation.
Figure 9B:
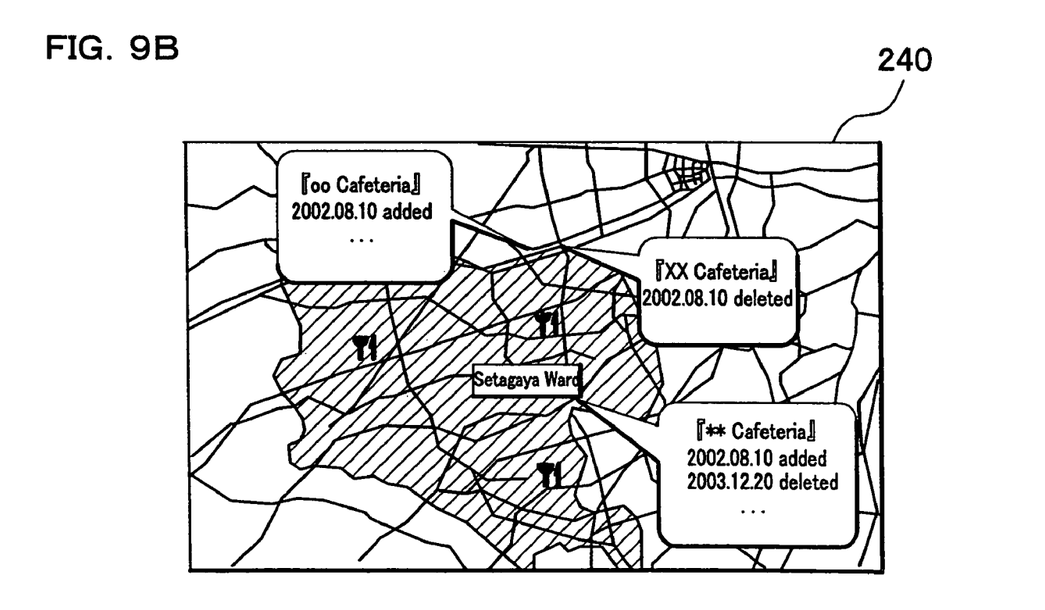
FIG. 9B is an example of the presentation of updating recapitulation in the more detailed map.

FIG. 9 shows an example of the graphical display of the update recapitulation based on the update recapitulation data. The example shown in FIG. 9A is a graphical presentation of the location of updating and the date of the updating held in the past in Tokyo Metropolitan areas as shown in the display 230. The example shown in FIG. 9B is a graphical presentation of the further detailed update recapitulation in a way that the updated date and time, the updating procedure (content update, appending, deleting, etc.) and the name of the facility can be confirmed regarding Setagaya ward of which past data were updated in the past. By recording the update recapitulation data corresponding to the locations on the map, it is possible to confirm the location updated in the past with the detail information such as the updating date and time.

Figure 10:
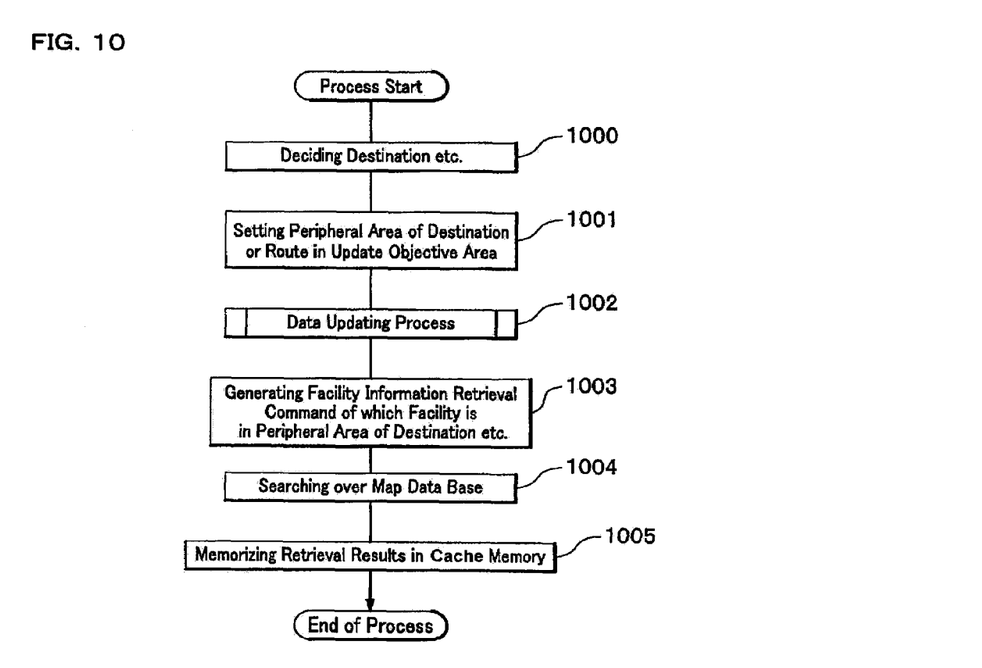
FIG. 10 is a flow chart that shows the steps for predictively updating and retrieving the map data.

FIG. 10 shows a flow chart that is to carry out the map data updating and the data retrieval. After the destination, the transit place or the route has been decided (1000) in the automobile navigation terminal 106, the peripheral area of the destination, the transit place or the route is set in the update objective area (1001). For the purpose of setting the update objective area, the distance obtained by referring to the user subjective setting 802 may be used. After retrieving the map data of the area from the server equipment 102, the data updating is carried out (1002). After then, the data base update controller 401 sends the command (1003) that is to retrieve the information of the facilities which are in the peripheral distance to the map data base controller 400 and the facility information has been searched over the data base and retrieved (1004). The facility data obtained after the retrieval is memorized in the cache memory (1005).

The facility data can be updated with the latest data regarding the facilities in the map data base in advance in accordance with predicting that the user will request the information retrieval of the facility data in the peripheral of the destination, transit place and the route. Then the user operates the fundamental navigation such as to set the destinations and the routes with no waiting time requirement for data updating and data retrieval by memorizing the facility information in the cache memory after retrieving from the map data base which have been updated.

In the present embodiment, the method to obtain the update data through the communication means. However the removable media such as memory cards can be used in a way that the updating data is recorded in such media and the automobile navigation apparatus retrieves the updating data so that the map data base is completely updated.

The present invention relates to an automobile navigation system, especially is applicable to the automobile navigation apparatus that retrieves the updating data and the updates the map data. Since the present invention updates the map data by obtaining the map data which does not depend on the data format of the map data, the user can use the desirable update data for the navigation such as the information retrieval, destination setting and route guidance by instructing the conditions such as the area and the data kinds. The customization of the data is possible in accordance with the preference of the users.

What is claimed is:

1. An automobile navigation apparatus comprising;
a map data base storing map data in a rewritable memory medium,
a map data management unit that classifies said map data into attributions of information properties characterized by said map data and composes tables including said attributions which are specified in records thereof and enables access to said map data in a unit of said records,
an updating data acquisition unit that transmits a request to update the map data and that acquires updated data of a map that includes updating procedure information transmitted in response to the request,
an information interpreting unit that interprets the updating procedure information, and that compiles the updating actions in the updating procedure information into commands that direct the automobile navigation apparatus to update the each specified map element in the updating procedure information; and
a map data updating unit that searches over said map data base based on a result of the interpretation,
wherein said acquired updating procedure information includes:
updating conditions for specifying map elements to be updated,
updating actions that describe updating commands to be performed by the automobile navigation apparatus to update the map data, wherein the commands include one or more of deleting, adding and modifying content, and
an order for performing the updating commands.

2. An automobile navigation apparatus according to claim 1, further comprising an input unit that inputs user subjective information, wherein
said update data acquisition unit acquires map data which is to be updated in accordance with said user subjective information input by said input unit, and
said map data updating unit updates said map data base after selecting acquired map data under a predetermined condition.

3. An automobile navigation apparatus according to claim 1, further comprising an updating recapitulation recording unit that records updating recapitulation information to correspond to area information and location information of map elements to be updated.

4. Server equipment comprising;
a map data base which records evaluation values computed by a predetermined set or plural sets of user subjective information in map data corresponding to map elements, and a communication unit for transmitting/receiving data to/from a terminal device, wherein
said server equipment receives user subjective information and transmits map data, which is obtained by searching over the map data base under a retrieval condition to which said received user subjective information is set, to a terminal device with appending data updating procedure information,
wherein said appending data updating procedure information includes updating conditions that specify map elements to be updated, and commands specifying operations for updating the specified map elements.

5. Server equipment comprising;
a map data base which records evaluation values computed by a predetermined set or plural sets of user subjective information in map data corresponding to map elements, and a communication unit for transmitting/receiving data to/from a terminal device, wherein
said server equipment receives evaluation values and transmits map data, which is obtained by searching over the map data base under a retrieval condition to which said received evaluation values are set, to a terminal device with appending data updating procedure information,
wherein said appending data updating procedure information includes updating conditions for specifying map elements to be updated, and commands specifying operations for updating the specified map elements.

6. An automobile navigation apparatus according to claim 1, wherein the map data management unit composes separate tables for frequently updated facility data and for less frequently updated facility data to change index updating timing and to avoid a long retrieval waiting time.

* * * * *

UNITED STATES PATENT AND TRADEMARK OFFICE
CERTIFICATE OF CORRECTION

PATENT NO. : 7,590,486 B2
APPLICATION NO. : 11/045067
DATED : September 15, 2009
INVENTOR(S) : Okude et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1200 days.

Signed and Sealed this

Twenty-first Day of September, 2010

David J. Kappos
*Director of the United States Patent and Trademark Office*